INVENTORS
COURTNEY H. WENGER
WALTER E. HEAD
BY
ATTY.

INVENTORS
COURTNEY H. WENGER
BY WALTER E. HEAD
ATTY.

United States Patent Office 3,162,562
Patented Dec. 22, 1964

3,162,562
TIRE BUILDING STOCK SERVICER
Courtney H. Wenger, Cuyahoga Falls, and Walter F. Head, Akron, Ohio, assignors to The B. F. Goodrich Company, New York, N.Y., a corporation of New York
Filed Oct. 10, 1962, Ser. No. 229,711
8 Claims. (Cl. 156—406)

This invention pertains to the manufacture of inflatable vehicle tires and in particular to a machine for supplying sheeted tire components to a tire building drum.

In the past the problems associated with supplying sheet material used in building vehicular tires to the drum upon which the components are assembled has been one which caused a great number of defects in the completed tire. In many cases the relative alignment of the ply stock and the various finishing and sidewall strips has been extremely critical. With most apparatus used in the past the alignment of the strips was solely dependent upon the operator's ability to manually align the material as it was applied to the tire building drum. Various expedients have been attempted to solve this problem, but for the most part there remained a great dependency upon the tire building operator's personal ability.

It is an object of this invention, therefore, to provide an apparatus whereby the various sheet components used in building the tire may be sequentially and accurately aligned with the tire building drum prior to being wound about the drum.

It is another object of this invention to provide an apparatus wherein the various components of sheet material are easily accessible to the tire building operator, and may be properly aligned with the tire building drum without the necessity for manual lateral adjustment of the material by the operator.

It is a further object of this invention to provide an apparatus for the application of sheet material to a tire building drum wherein the material to be applied to the drum may be brought to a point in close proximity to the drum before being removed from the machine.

Figure 1:
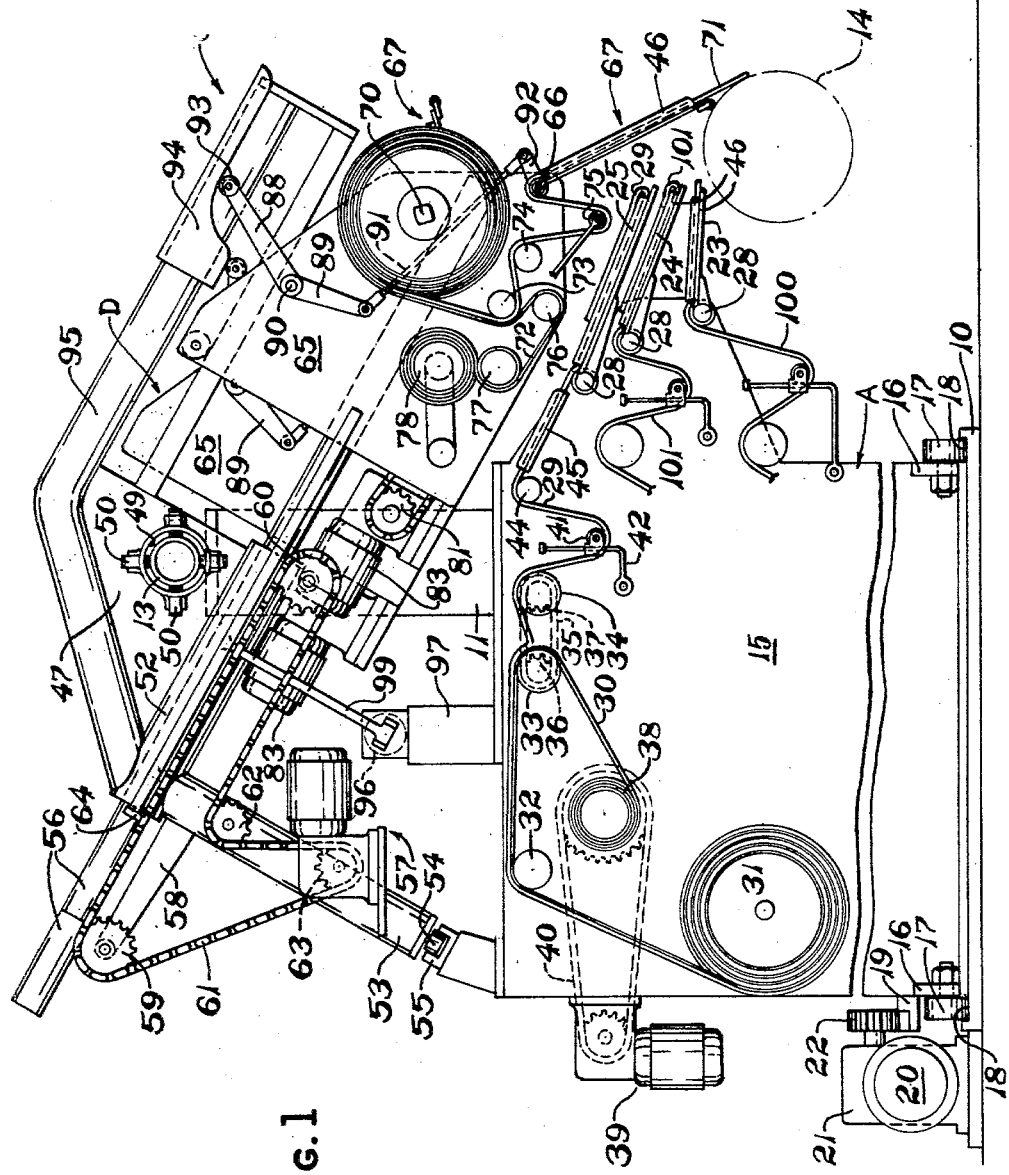
Figure 2:
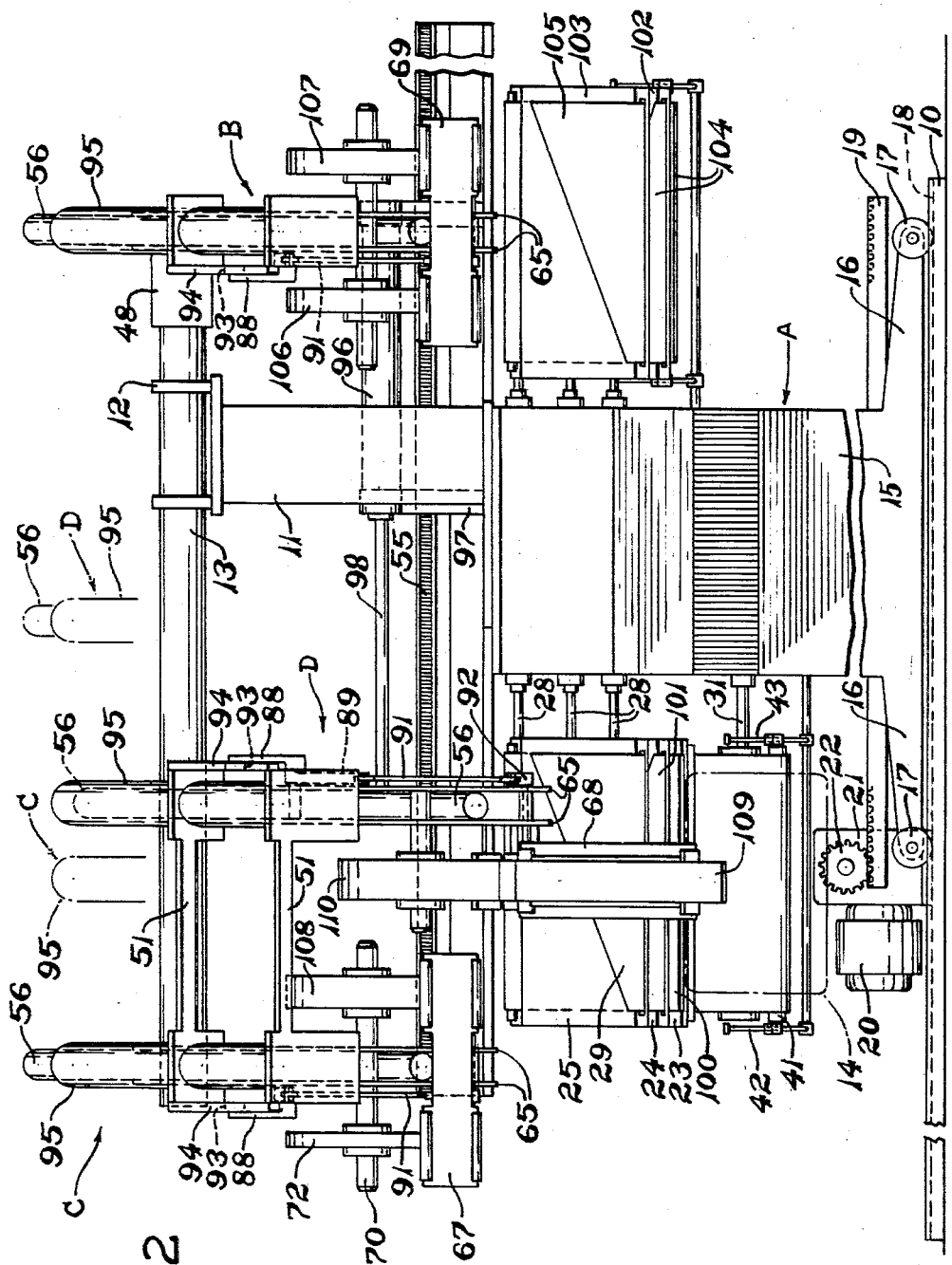
Figure 3:
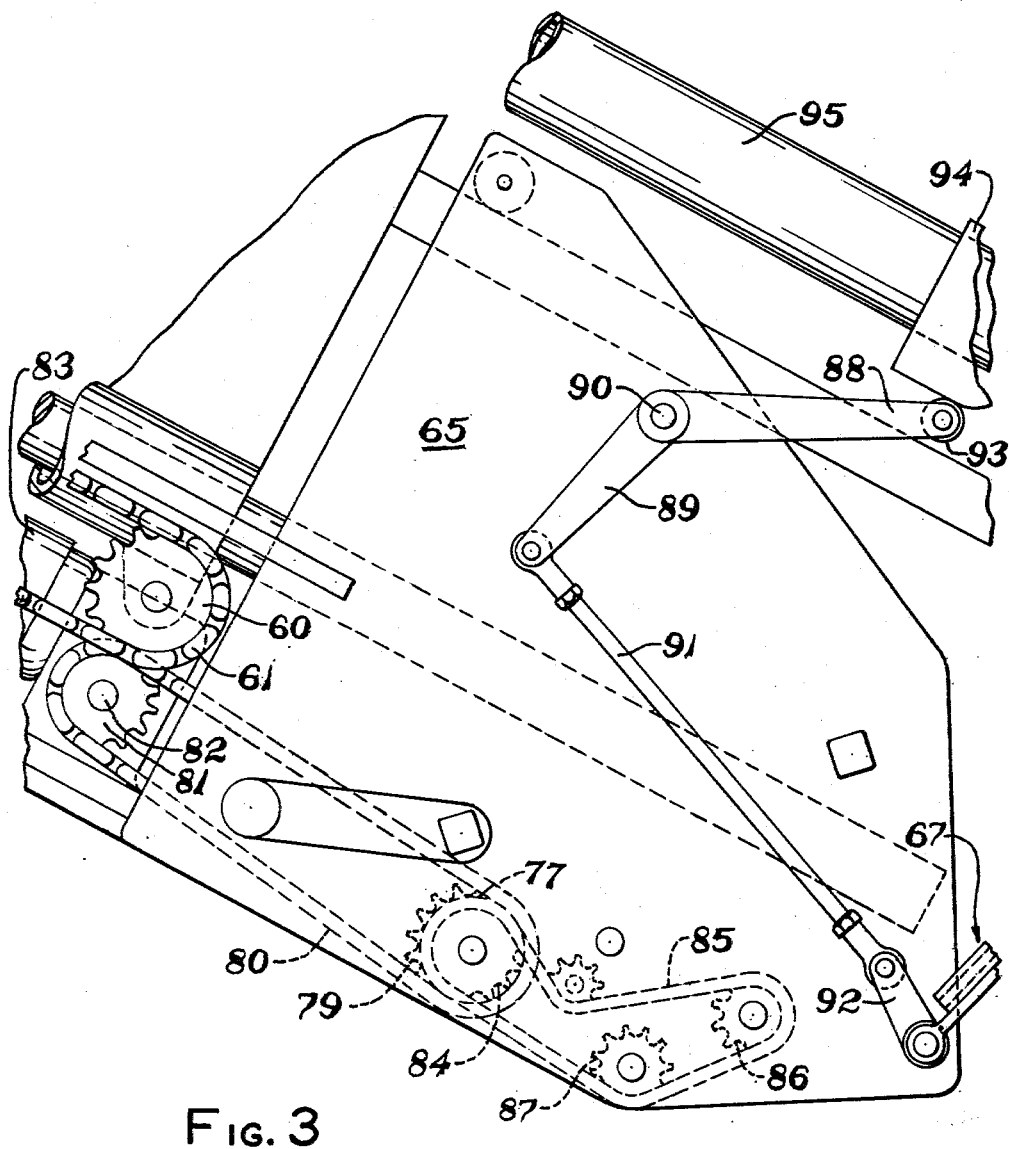

Further objects and advantages to be gained through the use of the present invention will be readily apparent to those skilled in the art to which it pertains from the following detailed description of a presently preferred embodiment of this invention and with reference to the drawings forming a part of this application, in which:

FIG. 1 is a side elevational view of the apparatus with one of the strip applying assemblies shown in position for application of the strip to the tire building drum;

FIG. 2 is a front elevational view of the apparatus with the ply applicator pans shown in their lowered position, another of the strip applying assemblies shown lowered in strip application position, and with portions of the apparatus shown in FIG. 1 removed for clarity of presentation; and FIG. 3 is a fragmentary side elevational view to an enlarged scale of one of the strip application assemblies more completely showing its operative mechanism.

General Description

With reference to FIGS. 1 and 2 it will be seen that the apparatus comprises a carriage or central frame assembly A, movably mounted on a base platform 10. Mounted on either side of the carriage or frame assembly A are the multiple source fabric supply means or the various reinforcing ply letoff mechanisms which will be described more fully hereinafter. Mounted on the upper surface of the carriage or frame assembly A is a cylindrical vertical stanchion 11. At the upper end of vertical stanchion 11 is mounted a yoke member 12 in which is mounted a cylindrical crosshead support 13. Rigidly mounted at the right end of support 13, as viewed in FIG. 2, is the finishing strip applier assembly or cross slide member B. To the left of stanchion 11, as viewed in FIG. 2, and movably mounted on crosshead support 13, are the sidewall applier assembly or cross slide member C and the sealing strip applier assembly or the cross slide member D.

Thus, it will be seen that by moving the central frame assembly A to left or right and by moving assemblies C and D upon crosshead support 13, all in preset predetermined manner, all portions of the strip and ply letoff assemblies may be moved into alignment with a tire building drum 14, shown only in phantom, which is rotatably mounted adjacent to the apparatus. Each of the assemblies generally described above will be described in detail hereinafter.

Central Frame Assembly

The frame assembly A has a vertical central portion 15 with generally horizontal foot members 16 projecting from the lower portion thereof. Rotatably mounted at the outer end of each foot member 16 is a roller 17 engaged in a track 18 formed in the upper surface of the base plate 10. Mounted on the rear of portion 15 is a horizontal rack 19. Mounted on base platform 10 to the rear of assembly A is a drive motor 20 connected through a reducer 21 to a pinion gear 22 engaged with rack 19. Thus, as pinion 22 is rotated, frame assembly A may be moved along base platform 10 relative to the position of the tire building drum 14 adjacent thereto. On each side of assembly A and located near the front thereof are ply applicator pans. As shown in FIGS. 1 and 2, on the left side of frame assembly A is an inner liner applicator pan 23 and first and second ply applicator pans 24 and 25, respectively. To the right side of assembly A are mounted a third ply applicator pan 26 and a fourth ply applicator pan 27. Each of these pans are pivotally mounted to assembly A by means of shafts such as 28. In view of the fact that sheet material is supplied to each of these applicator pans in somewhat identical manner, the sheet letoff details are shown only for pan 25 in FIG. 1. It will be seen that reinforcing ply stock 29 wound in a liner 30 is mounted on a letoff shaft 31 from which it is unwound and passed over a roll 32 to a pair of rolls 33 and 34. Interiorly of assembly A rolls 33 and 34 are connected for joint rotation by means of a chain 35 passing about sprockets 36 and 37 mounted on the supporting shafts for rolls 33 and 34, respectively. Sprocket 37 is made to a smaller diameter and has fewer teeth than sprocket 36. Therefore, roll 34 has a slightly greater peripheral speed than roll 36. It will be seen that the liner 30 in which ply stock 29 is wound passes about roll 33 and is wound up on a windup roll 38. Windup roll 38 is driven by means of a motor drive 39 connected thereto by means of a drive chain 40. The ply stock 29 is separated from the liner 30 and passed over roll 34. The greater peripheral speed of roll 34 aids in stripping the stock 29 from the surface of the liner 30. The ply stock then passes beneath dancer roll 41 rotatably mounted between a pair of vertical guides 42 and 43. Dancer roll 41 is capable of vertical movement along guides 42 and 43. The ply stock 29 then passes about a roll 44 which introduces it through a guide member 45 to the ply letoff pan 25. Movement of dancer roll 41 along its vertical guides 42 and 43, due to movement of ply stock 29, controls the operation of the motor drive unit 39 to wind the liner 30 about its windup roll 38. Movement of dancer roll 41 may be sensed by a suitable limit switch, which is not shown, the operation of which is well understood by those skilled in the art. With the ply stock 29 being available to the tire building operator at the front edge of ply applicator pan 25 the operator may stitch down the leading edge of the stock to the surface of the building drum 14 or to the layers of preceding ply material applied thereto. The drum may then be rotated in a conventional manner to draw the ply stock from its letoff mechanism. When the drum 14 is entirely encircled by the stock 29 the operator may cut or tear the stock, depending upon its nature, and allow the new leading edge protruding from pan 25 to be folded back over the pan cover 46. The pan 25 may, if desired, then be pivotally raised about its shaft 28 to a position where it does not interfere with subsequent tire building operations.

*Overhead Applicator Assemblies*

In view of the similarity of the structure of the assemblies B, C and D, a detailed description of but one of the assemblies, C, will suffice to teach the arrangement and operation of the structural and motive portions thereof. Each such assembly has a generally triangular web portion 47. In the case of assembly B, web portion 47 is rigidly mounted on the crosshead support 13 by means of a boss 48. Assemblies C and D each have an opening as at 49 through which member 13 protrudes. Mounted about opening 49 on portion 47 are a plurality of rollers 50 in contact with crosshead support 13 which movably support the web member 47. It should also be noted that assemblies C and D are rigidly joined to one another by means of cross braces 51 for joint movement along support 13.

Mounted on the under side of web portion 47 is a tubular member 52. Projecting downward and rearward from member 52 is a support member 53. At the lower end of member 53 is a rotatable cam follower 54 engaged in a horizontal cam track 55 which extends along the upper rear edge of frame assembly A and projects to either side thereof. Thus, each assembly, such as C, is supported above frame assembly A by means of its mounting on crosshead support 13 and the engagement of member 53 with cam track 55.

Slideably mounted within the member 52 is a slide bar support 56. Support 56 is slideably moved in member 52 by actuation of a drive unit 57 mounted on support 53, as seen only in FIG. 1. Mounted to the rear of support member 53 by means of a support arm 58 is a rotatable sprocket 59. Near the front end of member 52 is mounted a second sprocket 60. A chain 61 passes about sprockets 59 and 60, and idler sprocket 62 mounted on member 53 and a sprocket 63 mounted on the output shaft of drive unit 57. Chain 61 has a lug 64 which is attached to the slide bar support 56 for movement thereof in response to movement of chain 61. Mounted near the front end of each slide bar support 56 are a pair of parallel vertical support plates 65. Pivotally mounted to the side of each plate 65 by means of shaft 66, with the exception of assembly D having but one, is a strip letoff pan such as 67 and assembly C. This is identified as letoff pan 68 for assembly D and 69 for assembly B. With reference to assembly C, a shaft 70 projecting horizontally from plate 65 retains a roll of white sidewall strip material 71 wound in a liner 72. The white sidewall material 71 passes about rolls 73 and 74 and then about a dancer roll 75 pivotally mounted on support plate 65. The liner 72 separates from the white sidewall stock and roll 73 passes about an idler roll 76, and a friction drive roll 77 to a windup roll 78, pivotally mounted on plate 65, to be urged against drive roll 77 under the force of gravity. Friction drive roll 77 has a sprocket 79, only seen in FIG. 3, mounted on its inboard end. Sprocket 79 is driven by means of a chain 80 which, in turn, is driven by a sprocket 81 mounted on the output shaft 82 of a motor drive unit 83 mounted on the rear of plates 65. With reference to FIG. 3 it will be seen that a sprocket 84 is keyed to the shaft of roll 77 and that a chain 85 passing thereabout drives rolls 74 and 76 by means of sprockets 86 and 87 mounted on the respective support shafts for these rolls. It will be seen that sprocket 86 has fewer teeth than sprocket 87 and therefore sprocket 86 will be driven at a greater speed. Therefore, the rolls 74 and 76, which each have the same diameter, will be driven at different speeds, roll 74 having the greater speed and thus facilitating removal of the white sidewall strip material 71 from its supply liner 72. Pivotally mounted on plate 65 is a cam arm 88 with a toggle arm 89 mounted thereto for their joint movement about their pivot point 90. A toggle link rod 91 pivotally connects the end of toggle arm 89 with the end of a toggle arm 92 mounted on shaft 66 and rigidly connected to the letoff pan 67. At the outer end of cam arm 88 is mounted a cam follower 93 which is engaged with an overhead cam member 94. Cam member 94 is mounted on an overhead tubular support member 95 mounted on the upper side of the web portion 47 of assembly C, and also mounted on tubular member 52. Thus, as drive unit 57 is actuated to move the slide bar support 56 within member 52 cam follower 93 moves along the cam surface of cam member 94 and through the aforementioned connections causes letoff pan 67 to be lowered to a position at which its outer edge is in contact with, or closely adjacent to, the tire building drum 14 as support 56 is moved generally downward and forward. The reverse is true as support 56 moves in the opposite direction, follower 93 moving along cam member 94 to cause letoff pan 67 to be moved to its raised position as shown in full line in FIG. 2, and as shown in phantom in FIG. 1.

Movement of assemblies C and D relative to the crosshead support 13 is accomplished by a double acting fluid pressure cylinder 96 which is mounted above central frame assembly A and to the rear of vertical stanchion 11 by means of a vertical support member 97. The piston rod 98 of cylinder 96 has its outer end rigidly mounted to applier assembly D by means of a connecting support 99, and the other end mounted to the tubular member 52. Because assemblies C and D are joined by cross braces 51 movement of piston rod 98 moves both assemblies C and D together.

*Machine Operation*

In operation of the tire building stock servicer the machine operator starts his tire building operations with the central frame assembly A in the position shown in full line in FIG. 2. At this point in the operation of the machine, piston rod 98 is in its retracted position holding assemblies C and D in their locations shown in phantom in FIG. 2, with respect to the crosshead support 13. The operator pulls letoff pan 23 to its position shown in full line in FIG. 1 and allows the drum 14 to remove the inner liner stock 100 from its supply roll, not shown. The operator then pulls pan 24 down into application position, stitches the leading edge of the first reinforcement ply stock 101 from its supply roll, not shown, and then lowers letoff pan 25 to apply the second layer of reinforcing ply stock 29. As each of these plies are applied and cut from their respective supply strip, the leading edge of the stock is folded back over the pan cover 46. With the completion of the application of the second layer of ply stock 29 to the drum 14 drive motor 20 is actuated to move the frame assembly A to the full extent of its left hand movement. The extent of this movement is determined by limiting controls well known in the art, therefore neither described nor illustrated in this application. At this point similar ply letoff pans 102 and 103 are aligned with the tire building drum 14 in such a manner that the center line of the ply stock which may be drawn therefrom coincides with a vertical plane passing through the center of the tire building drum and perpendicular to its longitudinal axis. The operator then draws the third layer of reinforcing ply stock 104 from pan 102 and allows it to be wound about the drum 14. Sequentially, the fourth layer of reinforcing ply stock 105 is introduced to the tire building drum 14 from letoff pan 103. It will be understood that ply stock 104 and 105 are let off from their respective supply rolls in the same manner as ply stock 29, which has previously been described in detail. At this time drive unit 57 associated with the finishing strip applier assembly B is actuated to advance letoff pan 69 to a position in contact with or closely adjacent the material already applied on drum 14. The operator then draws from each side of this pan a non-wicking finishing strip 106 and 107 and allows them each to be wound in one layer about the tire building drum. Upon completion of this actuation the drive unit 57 for this assembly is actuated in reverse to retract pan 69 from drum 14. As pan 69 is being retracted, drive motor 20 is also actuated in reverse to return the central frame assembly A to its original starting position. As assembly A reaches this right hand position the drive motor 57 associated therewith is actuated to advance letoff pan 67 toward the surface of drum 14. When pan 67 reaches this position the operator draws the white sidewall strip 71 from its supply roll on one side of the assembly and allows one layer thereof to be wound about drum 14. Upon the completion of this operation air cylinder 96 is actuated to move assemblies C and D to their full line positions as shown in FIG. 2. Again, the extent of this movement is controlled by limit switches well known in the art and therefore neither described nor illustrated in this application. At this point the roll of what is known as non-staining strip material is properly aligned relative to the drum 14 and the operator draws this material from its supply roll 108, allowing it to be applied in one layer. Upon the completion of this application, motor unit 57 associated with assembly C is actuated in reverse direction to retract letoff pan 67 from drum 14. As letoff pan 67 is so retracted, air cylinder 96 is allowed to further extend its piston rod 97 to carry assemblies C and D to such a position that a second strip of non-staining material 109 is properly aligned with drum 14 for application thereto. The drive unit 57 associated with assembly D is then actuated to move the strip letoff pan 68 to the drum 14, at which time the operator may draw the strip 109 to the drum and allow it to be drawn from its supply roll 110 by rotation of the drum 14. Upon the completion of this operation, drive unit 57 associated with assembly D is operated in reverse direction to retract letoff pan 68; and the fluid supplied to cylinder 96 is controlled in a manner to retract piston 97, thereby returning assemblies C and D to their positions shown in phantom in FIG. 2. The stock servicing apparatus is now in a position to repeat the cycle for building another tire, and after completion of the stitching of the various plies on the drum 14 and the application of thread and black sidewall stock thereto, from another source not shown, and unrelated to this invention, the operator may remove the completed tire carcass from the drum 14 in preparation for a repetition of the foregoing operating cycle.

Although the controls for actuating the various components of the apparatus have not been described in detail, various expedients will be apparent to those skilled in the art. For instance, it is possible for the operator to control each separate movement of the assemblies by pushing one of a series of control buttons on a control panel. It has been found desirable however, to control the present embodiment of the invention by means of a programmed tape, tape reader and switching circuit. A switching circuit such as disclosed in the United States patent to H. G. Shively, No. 2,799,812, or a similar circuit using crystal diodes in place of vacuum tubes has been found suitable for this purpose.

Furthermore, although the tire building stock servicer has been described with reference to a specific and presently preferred embodiment thereof as it pertains to its use in manufacturing a white sidewall tire, it will be readily appreciated by those experienced in the art to which it pertains that removals from and additions to said apparatus and changes in its mode of operation may be made within the spirit and scope of the following appended claims.

We claim:

1. Apparatus for supplying sheet material to a rotatable building form, comprising a first portion movably mounted on said apparatus adjacent a rotatable building form, means on said apparatus to move said first portion in a first direction which direction is parallel to the axis of rotation of said guiding form, a second portion movably mounted on said first portion, means on said first portion operatively connected to said second portion to move said second portion in a direction perpendicular to the direction of movement of said first portion, at least one other portion movably mounted on said first portion, means on said first portion operatively to move said other portion in a direction perpendicular to the direction of movement of said first portion, and means to move said other portion relative to said first portion in a direction of movement parallel to the direction of movement of said first portion, and at least one sheet material letoff means mounted on each of said portions whereby various elements of sheet material may be sequentially supplied to said building form.

2. In a tire manufacturing apparatus for supplying sheet or fabric material to a rotatable building form having a longitudinal axis of rotation, a support frame, a carriage movably mounted on said frame, means on said frame operatively connected to said carriage for moving said carriage on said frame in a direction parallel to said axis to selectively align different portions of said carriage with said building form, multiple source fabric supply means mounted on said carriage, each of said fabric supply means movable in a direction normal to said longiturinal axis, and means on said carriage operatively connected to said multiple source supply means for moving each of said multiple source supply means selectively in said normal direction.

3. In a tire manufacturing apparatus as set forth in claim 2 wherein each of said multiple source supply means comprises a cross slide member with a supply roll rotatably mounted thereon.

4. Apparatus for supplying sheet material to a rotatable building form having a longitudinal axis of rotation, a support frame, a carriage movably mounted on said frame, means on said frame operatively connected to said carriage for moving said carriage on said frame in a direction parallel to said axis, a pair of cross slide members movably mounted on said carriage, means on said carriage connected to said cross slide members for moving said cross-slide members selectively in a direction perpendicular to the direction of movement of said carriage, means mounted on said carriage operatively connected to one of said cross slide members for moving said one cross slide member in a direction of movement parallel to the direction of movement of said carriage, and at least one sheet material supply roll means on each of said cross slide members for delivery of sheet material to such building form.

5. Apparatus as set forth in claim 4 wherein said carriage has sheet material supply roll means thereon for delivery of sheet material to such building form, and each of said sheet material supply roll means includes a pivotable sheet letoff pan for receiving material from said supply roll means.

6. An apparatus for supplying sheet material to a rotatable building form comprising a support frame, a carriage movably supported on said frame, means on said frame operatively connected to said carriage for moving said carriage on said frame in a first direction which direction is parallel to the axis of such rotatable building form, a pair of support means movably mounted on said carriage, means mounted on said carriage operatively connected to said support means for moving said support means in a direction parallel to the direction of movement of said carriage, each of said support means having a cross slide member movably mounted thereon, means on said support means operatively connected to each of said cross slide members for moving said cross slide members selectively in a direction perpendicular to the direction of movement of said carriage, and supply roll means rotatably mounted on said carriage and on each of said cross slides for supplying fabric or sheet material to such building form.

7. An apparatus for supplying sheet material to a rotatable building form comprising a support frame, a carriage movably supported on said frame, means on said frame operatively connected to said carriage for moving said carriage on said frame in a first direction which direction is parallel to the axis of such rotatable building form, a pair of support means movably mounted on said carriage, means mounted on said carriage operatively connected to said support means for moving said support means simultaneously in a direction parallel to the direction of movement of said carriage, each of said support means having a cross slide member movably mounted thereon, means on said support means operatively connected to each of said cross slide members for moving said cross slide members selectively in a direction perpendicular to the direction of movement of said carriage, another cross slide member mounted on said carriage movable therewith, means on said carriage operatively connected to said other cross slide member for moving said other cross slide member in a direction perpendicular to the direction of movement of said carriage, supply roll means mounted on said carriage and on each of said cross slide members, each of said supply roll means comprises a rotatable support roll having elastomeric sheet material wound up in a fabric liner with separation means to separate said sheet material from said liner, a liner windup roll, drive means to rotate said windup roll, and a pivotal letoff pan.

8. An apparatus as set forth in claim 7 wherein each of said separation means further comprises a pair of rotatable rollers with one of said rollers operative to direct liner material thereover onto said liner windup roll and the other of said rollers operative to direct elastomeric material to said letoff pan, and means operative to drive said one roller at a speed greater than said other roller to thereby facilitate the removal of the liner from the elastomeric material.

References Cited by the Examiner
UNITED STATES PATENTS

| | | | |
|---|---|---|---|
| 1,734,242 | 11/29 | Wikle | 156—405 |
| 1,966,087 | 7/34 | Bostwick | 156—405 X |
| 2,365,341 | 12/44 | Haren et al. | 156—406 |
| 2,395,020 | 2/46 | Sternard | 156—406 X |
| 3,012,602 | 12/61 | Nebout | 156—406 |
| 3,017,312 | 1/62 | Kraft | 156—406 X |

EARL M. BERGERT, *Primary Examiner.*